(No Model.) 3 Sheets—Sheet 1.

J. SIMPSON.
PIPE WELDING APPARATUS.

No. 507,289. Patented Oct. 24, 1893.

WITNESSES
Thomas W. Bakewell
H L Gill

INVENTOR
James Simpson

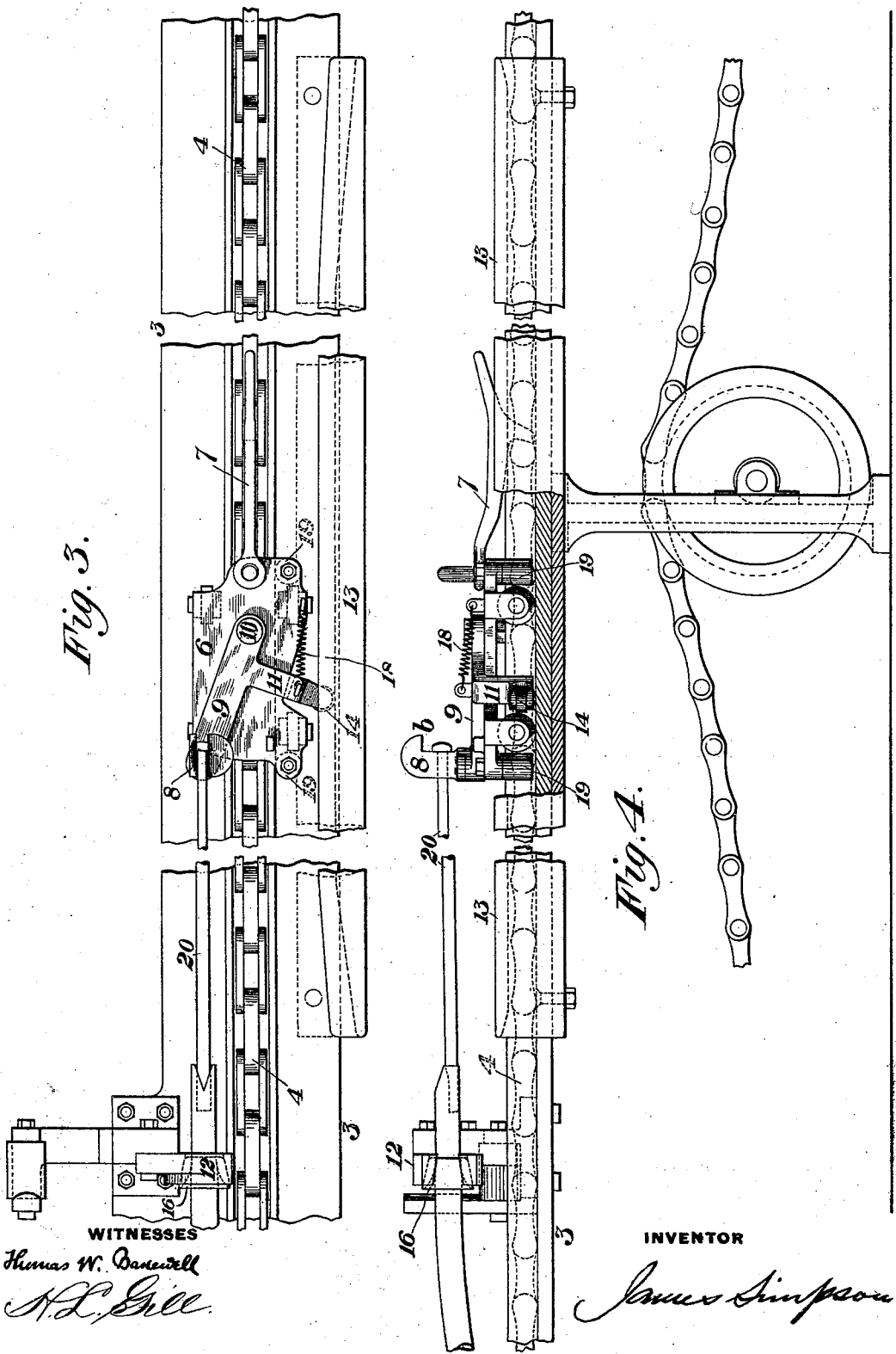

(No Model.) 3 Sheets—Sheet 3.

J. SIMPSON.
PIPE WELDING APPARATUS.

No. 507,289. Patented Oct. 24, 1893.

WITNESSES
Thomas W. Bakewell
H. L. Gill

INVENTOR
James Simpson

United States Patent Office.

JAMES SIMPSON, OF McKEESPORT, PENNSYLVANIA.

PIPE-WELDING APPARATUS.

SPECIFICATION forming part of Letters Patent No. 507,289, dated October 24, 1893.

Application filed December 20, 1892. Serial No. 455,790. (No model.)

*To all whom it may concern:*

Be it known that I, JAMES SIMPSON, of McKeesport, in the county of Allegheny and State of Pennsylvania, have invented a new and useful Improvement in Pipe-Welding Apparatus, of which the following is a full, clear, and exact description, reference being had to the accompanying drawings, in which—

Figure 1:
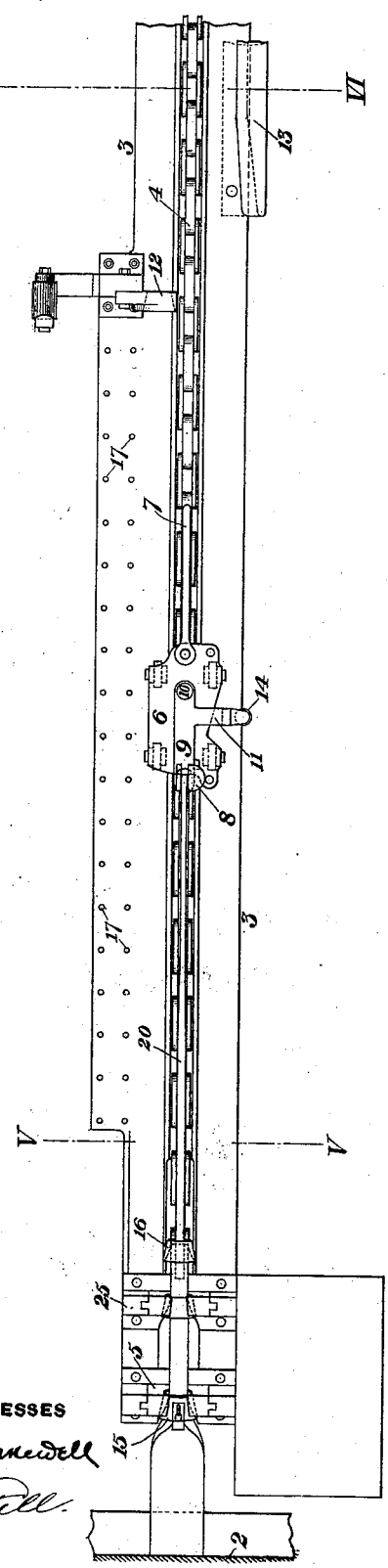
Figure 2:
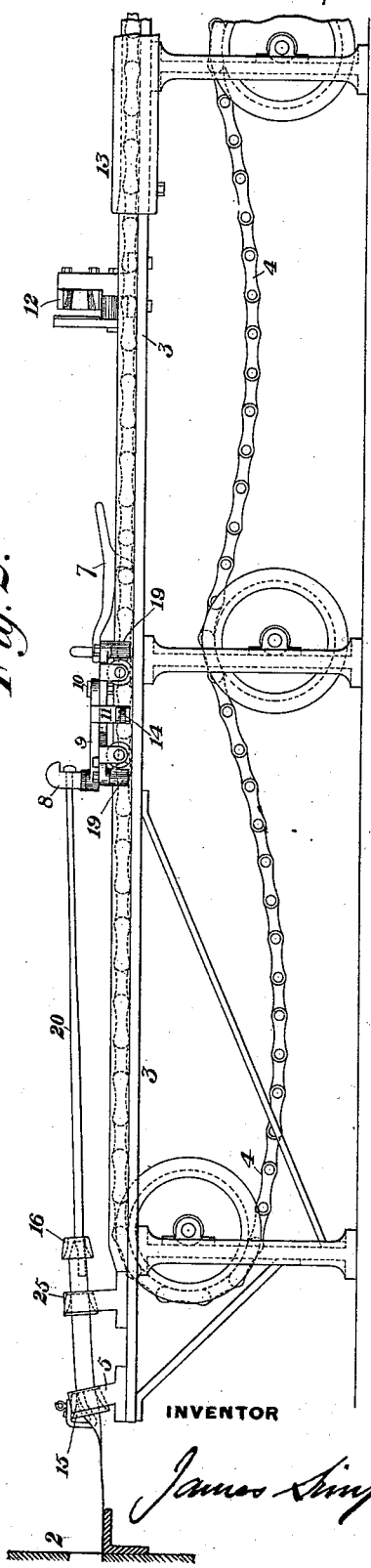
Figure 7:
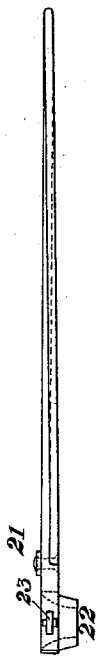
Figure 8:
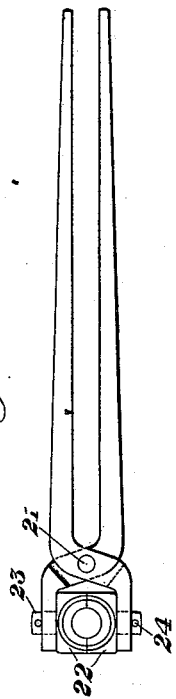
Figure 5:
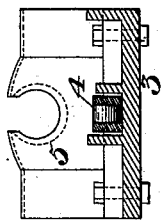
Figure 6:
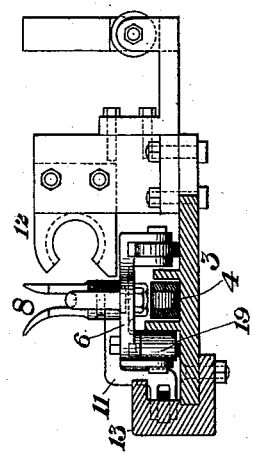

Figure 1 is a plan view of the part of a draw-bench next to the furnace provided with my improvement. Fig. 2 is a side elevation thereof. Fig. 3 is a plan view on a larger scale of a more advanced part of the draw-bench, showing the second bell-holder. Fig. 4 is a side elevation of the same, partly in longitudinal vertical section. Fig. 5 is a vertical cross-section on the line V—V of Fig. 1; and Fig. 6 is a vertical cross-section on the line VI—VI of Fig. 1; and Fig. 7 is a plan view of a pair of pipe-squeezing tongs of my invention. Fig. 8 is a side view thereof.

The principal object of my invention is to provide improved means by which in the manufacture of pipe the skelp can be drawn through a supporting welding bell after passing through the first bell, and the welding action thus improved. This has been done heretofore by means of a second bell-holder set in advance of the first, and adapted to be moved into the path of the skelp after the passage of the buggy. There are several objections to this apparatus, which it is the object of my invention to overcome.

To this end my invention consists in a pipe-welding apparatus comprising a buggy, a second bell-holder set at the side of the draw-chain, and preferably provided with means for moving the tang laterally to bring the skelp to the second bell-holder. I am thus enabled to effect the desired result by simple mechanism and without moving the second bell-holder, and I thus render the work easier to perform, safer in its results, and I obtain other incidental advantages hereinafter described.

In the drawings, 2 represents the door of the heating-furnace. 3 is the draw-bench, 4 the drawing apparatus consisting of the usual draw-chain, 5 the first bell-holder, set at the furnace-end of the bench, and 6 the buggy set on a track on the bench and adapted to be connected to the chain by a hook 7 and to be drawn thereby along the bench. The usual buggy-horn 8 to which the skelp-tang is attached, instead of being mounted directly on the buggy, is set on a vertical pivot on a laterally movable carrier consisting of a lever 9 pivoted to the buggy at 10, and provided with a laterally extending arm 11. The rear side of the buggy-horn is preferably of hook-form as at $b$ in Fig. 4, thus affording means for holding the skelp-tang with greater security.

12 is a second bell holder set on the table, made of forked form with its open end next to the chain, and in advance of this bell-holder are means by which the horn on the buggy is moved laterally so as to cause the tang to enter the end of the bell-holder. The device which I prefer to use for this purpose consists, preferably, of a deflecting guide or stationary cam-surface 13. When the buggy comes opposite thereto, a roller 14 at the end of the arm 11 engages the cam-surface and moves the lever 9 laterally on its pivot, as shown in Fig. 3, thus bringing the tang 20 within the forks of the bell-holder.

In order to reduce the friction of motion of the buggy during the engagement of the arm 11 with the cam-surface 13, I provide the buggy with upright anti-friction rollers 19, having a lateral bearing on the draw-bench.

The operation is as follows: The tang, having been fixed to the skelp by welding or otherwise, is hitched to the horn of the buggy, two bells 15 and 16 having been first strung upon the tang, and the tang having been set in the fork of the first bell-holder, the buggy is drawn along the bench by the chain, thus drawing the skelp through the first bell, turning up its edges and welding it. When the buggy reaches the cam-surface 13, the lever-arm is engaged thereby, and the tank moved laterally into the fork of the second bell-holder, and when the bell 16 strung upon the tang reaches this bell-holder it is engaged and held thereby, and in the further advance of the buggy the pipe is drawn through the bell. The fact that the pipe is thus deflected somewhat out of line is not an objection, for the distance of the second bell-holder from the first (preferably twenty feet, more or less) is enough to make the angle of deflection small; and, if desired, the second bell-holder may be set so far in advance that the skelp may have passed or nearly passed the first bell-holder before entering the second. In order to adjust the distance of the second bell-holder from the first, I prefer to make it movable, and to provide the bench with a series of bolt-holes 17 to which it may be attached. The cam-surface 13 is likewise adjustable. As the skelp-tang is moved laterally after the second bell-holder is reached, the skelp is drawn along the side of the draw-bench not directly over the chain, and when it has passed through the second bell-holder the skelp is deposited directly on the side of the bench. The tang is then detached from the buggy, and by the action of a spring 18, the lever 9 is drawn back to its original position. The fact that the skelp is thus moved laterally on the bench is of importance for the following principal reasons: Heretofore, when the skelp is drawn directly over the chain, and, in fact rests on the chain after it has passed the bell-holder, the operator in charge must quickly detach the tang from the buggy to check the latter's progress, and must move the pipe at once off the chain. But sometimes through carelessness, the boy is not quick enough in pulling the pipe over, and the pipe being carried on by the chain drives the buggy off the end of the bench. This cannot happen with my apparatus, in which the pipe moves over the bench—not over the chain—and rests thereon quite still as soon as the tang is disengaged. Furthermore, as the skelp moves along one side of the bench, it leaves the other side free for the operatives to charge another skelp plate into the furnace without waiting for the pipe to pass entirely through the bell, as is the case with apparatus in which the pipe moves directly over the chain and in which, by reason of its heat and its proximity to the charging side of the bench, the pipe makes work of the charging very hot and often impossible during the drawing operation.

It will be understood that broadly stated, the novel feature of this part of my invention above described consists in the use of a bell-holder set at the side of the draw-chain. This results in important advantages, and while I prefer to use it in combination with devices for automatically moving the skelp laterally thereinto, my broader claim is not limited thereto, since it is within the scope of my invention to pull the skelp over into the bell-holder by means of a hook.

In Figs. 7 and 8 I show squeezing tongs adapted to use in connection with my apparatus, and especially adapted for making very long pieces of pipe. They are pivotally connected at 21, and each has a semi-circular die 22, detachably connected to it by a tongue 23 and pin 24. The dies of the squeezing tongs have rearwardly extending projections of exteriorly conical form as shown in Fig. 7. In using the tongs, the skelp is grasped by them, and the projecting conical portions of the dies are fitted in the bell-holder so that as the skelp is drawn through them the crowding of the dies within the bell holder will hold them closed upon the skelp. This constitutes the novel feature of this part of my invention. Heretofore, squeezing-tongs have been held on the skelp merely by hand power, and the difficulty of the operation and the imperfect nature of the work done are overcome by my invention. These squeezing tongs may be used with any of the bell-holders shown in the drawings.

25 is a third bell-holder which, if desired, may be interposed between the bell-holders 5 and 12.

Within the scope of my claims modifications may be made in the form, construction and relative arrangement of the parts of the apparatus.

I claim—

1. In pipe-welding apparatus, the combination with the movable drawing-apparatus, of a bell-holder set at the side of the path thereof, and a buggy having a laterally-movable tang-carrier; substantially as described.

2. In pipe-welding apparatus, the combination with the draw-bench, and the movable drawing apparatus mounted thereon, of a bell-holder situate near the furnace end of the bench, and a second stationary bell holder set on said bench, at the side of the path of the drawing apparatus; substantially as described.

3. In pipe-welding apparatus, the combination with the movable drawing-apparatus, of a bell-holder set at the side of the path thereof, and shifting-apparatus adapted to shift the tang laterally into the bell-holder; substantially as described.

4. In pipe-welding apparatus, the combination with the movable drawing-apparatus, of a bell-holder set at the side of the path thereof, a buggy having a laterally movable tang-carrier, and a deflecting-guide with which the carrier engages and by which it is moved laterally into the bell-holder; substantially as described.

5. In pipe-welding apparatus, the combination with the movable drawing-apparatus, of a bell-holder set at the side of the path thereof, a buggy having a laterally movable pivoted tang-carrying lever having a projecting arm, and a deflecting-guide by which the arm is engaged; substantially as described.

6. In pipe-welding apparatus, the combination with the movable drawing-apparatus, of a bell-holder set at the side of the path thereof, a buggy having a laterally movable tang-carrier having a pivoted tang-holding horn, and a deflecting guide with which the carrier engages and by which it is moved laterally into the bell-holder; substantially as described.

7. In pipe-welding apparatus, the combination with the movable drawing-apparatus, of a bell-holder set at the side of the path thereof, a buggy having a laterally movable tang-carrier, a deflecting-guide with which the carrier engages and by which it is moved laterally into the bell-holder, and anti-friction rollers on the buggy; substantially as described.

8. Pipe-squeezing tongs, having projections, in combination with a holder into which the projections may enter to hold the tongs shut; substantially as described.

9. Pipe-squeezing tongs having tapering projections, in combination with a holder into which the projections may enter to hold the tongs shut; substantially as described.

10. Pipe-squeezing tongs having externally tapering divided dies, in combination with a holder into which the dies may enter; substantially as described.

JAMES SIMPSON.

Witnesses:
THOMAS W. BAKEWELL,
A. K. BAKEWELL.